US012776941B2

(12) United States Patent
Peyla et al.

(10) Patent No.: US 12,776,941 B2
(45) Date of Patent: Oct. 27, 2026

(54) VARIABLE MODULATION INTENSITY FOR LAYERED FM HD RADIO SERVICE MODES

(71) Applicant: iBiquity Digital Corporation, Columbia, MD (US)

(72) Inventors: Paul J. Peyla, Columbia, MD (US); Jeffrey S. Baird, Columbia, MD (US); Brian W. Kroeger, Columbia, MD (US)

(73) Assignee: iBiquity Digital Corporation, Columbia, MD (US)

( * ) Notice: Subject to any disclaimer, the term of this patent is extended or adjusted under 35 U.S.C. 154(b) by 72 days.

(21) Appl. No.: 18/855,038

(22) PCT Filed: Apr. 12, 2023

(86) PCT No.: PCT/US2023/018300
§ 371 (c)(1),
(2) Date: Oct. 8, 2024

(87) PCT Pub. No.: WO2023/200848
PCT Pub. Date: Oct. 19, 2023

(65) Prior Publication Data

US 2025/0233789 A1 Jul. 17, 2025

Related U.S. Application Data

(60) Provisional application No. 63/330,674, filed on Apr. 13, 2022.

(51) Int. Cl.
*H04L 27/36* (2006.01)

(52) U.S. Cl.
CPC .................................. *H04L 27/36* (2013.01)

(58) Field of Classification Search
CPC ...................................................... H04L 27/36
USPC ........................................................ 375/308
See application file for complete search history.

(56) References Cited

U.S. PATENT DOCUMENTS

| | | | | |
|---|---|---|---|---|
| 8,948,308 | B2 * | 2/2015 | Lim | H04L 27/183 375/295 |
| 2015/0139120 | A1 * | 5/2015 | ElArabawy | H04L 27/3488 370/329 |
| 2019/0182095 | A1 | 6/2019 | Suh et al. | |
| 2019/0349132 | A1 * | 11/2019 | Peyla | H04L 1/0071 |

OTHER PUBLICATIONS

International Search Report and Written Opinion issued in Appln. No. PCT/US2023/018300 mailed Jun. 22, 2023 (14 pages).

* cited by examiner

*Primary Examiner* — Lihong Yu
(74) *Attorney, Agent, or Firm* — Lerner David LLP

(57) ABSTRACT

Described herein are various embodiments of a system and method for varying the modulation intensity by scaling the constellation points of hierarchically modulated advanced FM service modes in HD Radio transmission systems. These embodiments include the novel ability to adjust the performance of the base layer of a hierarchically modulated signal relative to the overlay layer of the hierarchically modulated signal.

20 Claims, 13 Drawing Sheets

SSB1OV

VARIABLE MODULATION INTENSITY FOR LAYERED FM HD RADIO SERVICE MODES

CROSS REFERENCE TO RELATED APPLICATIONS

The present application is a national phase entry under 35 U.S.C. § 371 of International Application No. PCT/US2023/018300 filed Apr. 12, 2023, which claims priority from U.S. Provisional Patent Application No. 63/330,674 filed Apr. 13, 2022, the disclosure of which is hereby incorporated herein by reference.

BACKGROUND

Digital radio broadcasting technology delivers digital audio and data services to mobile, portable, and fixed receivers. In-band on-channel (IBOC) digital radio is one type of audio broadcasting technique in which signals can be transmitted in a hybrid format within the same channel allocations as the analog signals, including an analog modulated carrier in combination with a plurality of digitally modulated carriers. IBOC digital radio signals may also be transmitted in an all-digital format wherein the analog modulated carrier is not used. Transmitting in the hybrid format enables broadcasters to transmit analog AM and FM simultaneously with higher-quality and more robust digital signals.

IBOC systems may define a service mode of an IBOC radio signal for transmitting. Each service mode may have varied robustness and throughput. The system also supports a capability where different service modes forming a base layer and an overlay layer are broadcast in a single symbol stream, via layered or hierarchical modulation.

BRIEF SUMMARY

Generally described herein is an approach for improving the management of the throughput of IBOC radio signals while maintaining high-quality listenable radio signals. The approach includes modifying the scaling of the relative magnitude of the constellation points in layered service modes to affect the relative robustness or coverage of the overlay and base layer signals.

An aspect of the disclosure provides a radio transmitter comprising processing circuitry configured to generate a plurality of first symbols from a sequence of base bits, a plurality of second symbols from a sequence of overlay bits, and a plurality of constellation points associated with the plurality of first symbols and the plurality of second symbols. The processing circuitry may be further configured to modify one or more of the plurality of constellation points to produce a set of modified constellation points and to adjust a relative performance of the plurality of second symbols and the plurality of first symbols. The processing circuitry may be further configured to modulate one or more constellation points from the set of modified constellation points. The processing circuitry may also be configured to generate a composite transmission signal based on the one or more modulated constellation points, the composite transmission signal comprising a hierarchically modulated signal. The radio transmitter may also include a transmitter coupled to the processing circuitry and configured to wirelessly broadcast the composite transmission signal.

In another example, the processing circuitry may include a scaler that modifies the one or more of the plurality of constellation points to produce the set of modified constellation points.

In yet another example, the processing circuitry may include a symbol mapper configured to generate the plurality of constellation points.

In yet another example, the scaler may comprise a circuit element in the symbol mapper.

In yet another example, the processing circuitry may include an orthogonal frequency division multiplexing (OFDM) modulator.

In yet another example, the scaler may comprise a circuit element in the OFDM modulator.

In yet another example, the OFDM modulator may generate one or more OFDM symbols associated with the set of modified constellation points.

In yet another example, the processing circuitry may include a symbol mapper configured to generate the plurality of constellation points, a OFDM modulator and a scaler coupled to the symbol mapper and OFDM modulator, the scaler being configured to modify the one or more of the plurality of constellation points to produce the set of modified constellation points.

In yet another example, the plurality of second symbols may comprise symbols associated with a DSB1 service mode or an SSB1 service mode.

In yet another example, the plurality of first symbols may comprise symbols associated with an MP1X service mode, an MP3X service mode, an MP5 service mode, an MP6 service mode, a DSB1 service mode, or an SSB1 service mode.

In yet another example, each service mode may employ at least one of three modulations formats: quadrature phase-shift keying (QPSK), 16-ary quadrature amplitude modulation (16 QAM), and 64-ary quadrature amplitude modulation (64 QAM).

In yet another example, the processing circuitry may be further configured to modify the one or more of the plurality of constellation points by adjusting a distance between constellation points such that constellation points within a quadrant diverge to adjust the relative performance of the plurality of second symbols and the plurality of first symbols.

In yet another example, the processing circuitry may be further configured to modify the one or more of the plurality of constellation points by adjusting a distance between constellation points such that constellation points within a quadrant converge to adjust the relative performance of the plurality of second symbols and the plurality of first symbols.

Another aspect of the disclosure provides a method for transmitting a radio signal. The method may include generating a plurality of first symbols from a sequence of base bits. The method may also include generating a plurality of second symbols from a sequence of overlay bits. The method may further include generating a plurality of constellation points associated with the plurality of first symbols and the plurality of second symbols. The method may also include modifying one or more of the plurality of constellation points to produce a set of modified constellation points and to adjust a relative performance of the plurality of second symbols and the plurality of first symbols. The method may further include modulating one or more constellation points from the set of modified constellation points. The method may also include generating a composite transmission signal based on the one or more modulated constellation points, the composite transmission signal comprising a hierarchically modulated signal. The method may further include wirelessly broadcasting the composite transmission signal.

In another example, the method may also include generating one or more orthogonal frequency division multiplexing (OFDM) symbols associated with the set of modified constellation points.

In yet another example, the method may further include modifying the one or more of the plurality of constellation points by adjusting a distance between the one or more constellation points such that constellations within a quadrant diverge to adjust the relative performance of the plurality of second symbols and the plurality of first symbols.

In yet another example, the method may also include modifying the one or more of the plurality of constellation points by adjusting a distance between the one or more constellation points such that constellation points within a quadrant converge to adjust the relative performance of the plurality of second symbols and the plurality of first symbols.

DETAILED DESCRIPTION

Figure 1:
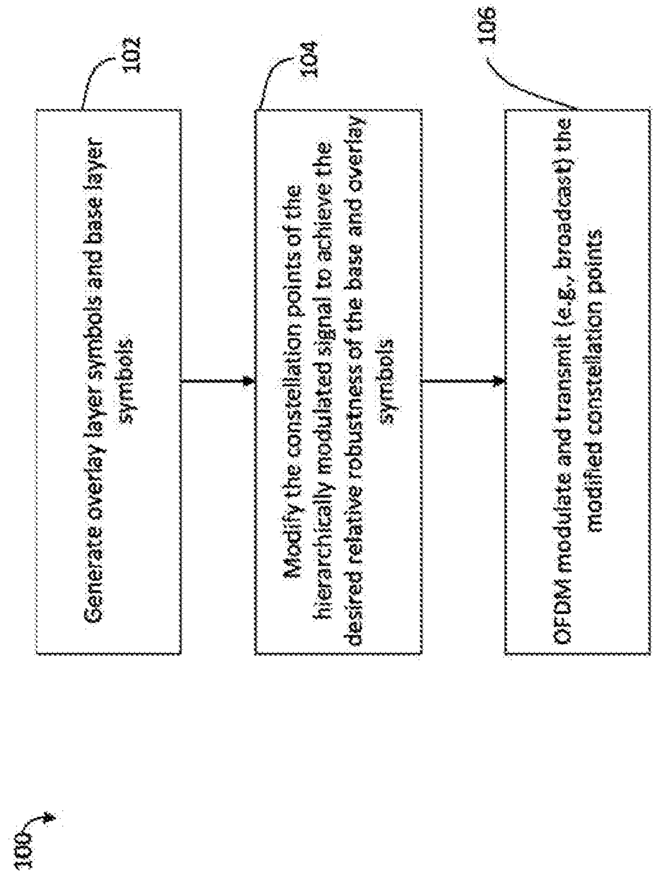
FIG. 1 depicts a flow diagram of an example method for modifying modulation intensity for layered frequency modulation (FM) HD Radio™ service modes according to aspects of the disclosure.

Described herein are various embodiments of a variable modulation intensity layered service mode system and method. Embodiments of the system and method adjust the modulation intensity by changing the magnitude of the constellation points, and thereby the relative robustness of base and overlay layers of hierarchically modulated advanced FM service modes in HD Radio transmission systems.

Traditionally, six standard service modes are available in FM HD Radio systems: MP1, MP2, MP3, MP5, MP6, and MP11. These service modes provide specific configurations of operating parameters specifying the throughput and robustness of the constituent logical channels. Recently, new service modes have been designed to increase capacity using quadrature amplitude modulation (QAM) and improve robustness using techniques such as a two-dimensional diversity scheme and improved forward error correction (FEC). The newly designed service modes are MP1X, MP3X, DSB1, SSB1, and MS5. These new service modes may feature frequency diversity between upper and lower sidebands. The new service modes may also feature time diversity between main and backup components. The new service modes may be referred to as Lower-Upper-Main-Backup (LUMB) service modes.

MP1X and MP3X service modes are designed to increase the capacity of the traditional MP1 and MP3 service modes in a backward-compatible manner (i.e., receivable by legacy receivers). DSB1 and SSB1 service modes may not be backward-compatible but may increase capacity and/or robustness. The SSB1 service mode may be identical to the DSB1 service mode except that the SSB1 service mode may transmit only one sideband. The MS5 service mode may be similar to the DSB1 service mode but the MS5 service mode configures the secondary subcarriers and swaps the upper and lower sidebands. These non-backward compatible service modes may be used to generate higher capacity for new radio signal applications. For example, new non-backward compatible service modes may be used for control of autonomous vehicles, control of IoT devices, or broadcast global positioning system (GPS) corrections.

Forward error correction (FEC) channel encoding, interleaving, OFDM subcarrier mapping, and OFDM modulation may be applied to each LUMB service mode by a processing circuitry at a transmitter. The FEC channel encoding may add error correction bits to the input data bits prior to transmission on the channel in order to correct bit errors and regenerate the bit stream. The FEC encoding may include Complementary Punctured Pair Convolutional (CPPC) coding.

The FEC-encoded bits of each of the MP1X, MP3X, DSB1, SSB1, and MS5 service modes may be distributed into a main component and a backup component. The data in the backup component may be delayed by a certain time relative to the main component, which may provide time diversity for the data to be transmitted. The processing circuitry within a transmitter may also assign input bits for the above service modes to upper and lower sidebands to provide frequency diversity to the data to be transmitted.

The radio signals in the above service modes may be interleaved in both time and frequency in a two-dimensional interleaver matrix. The interleaver may reorder the FEC-encoded bits to disperse burst errors. The main FEC-encoded bits may be interleaved in a main interleaver, and the backup FEC-encoded bits may be interleaved in a separate backup interleaver. After interleaving, the main and backup interleaver may be combined into a single composite interleaver structured in a matrix format. After combining, each composite interleaver partition may be mapped to a physical frequency partition and then each row in the interleaver matrix may be mapped to an OFDM symbol. An OFDM modulator may then generate a complex, baseband, time-domain pulse representing the digital portion of the IBOC signal for the particular symbol.

The newly designed service modes could be implemented in one of three digital modulation formats: QPSK, sixteen-point quadrature amplitude modulation (16-QAM), or sixty-four-point quadrature amplitude modulation (64-QAM). QPSK may use two code bits per subcarrier per symbol and may be considered a four-point quadrature amplitude modulation. 16-QAM may use four code bits per subcarrier per symbol and 64-QAM may use six code bits per subcarrier per symbol. 16-QAM may have twice the throughput of 4-QAM and 64-QAM may have three times the throughput of 4-QAM.

FEC encoding, interleaving, and OFDM symbol mapping may include a set of parameters uniquely tailored to the specified service mode and modulation type.

In addition to the foregoing service modes, some HD Radio implementations also support overlay service modes—for example, MP1XOV, MP6OV, DSB1OV, and SSB1OV. The data streams of the overlay service modes and base service modes are combined and modulated via a hierarchical or layered modulation scheme to form a signal stream that can be broadcasted over a coverage area. According to some examples, the performance of the overlay layer of a hierarchically modulated signal relative to the base layer may be adjusted by modifying the constellation points of the layered modulated signal. In an aspect of the disclosed technology, this is achieved by adjusting the position of the constellation points or scaling the distance between the constellation points (e.g., via a scaling factor). Where the distance between the constellation points within a quadrant is increased, the extracted bits or the demodulated symbols are more easily detectable for the overlay layer signal and less easily detectable for the base layer signal. On the other hand, when this distance is reduced, the constellation points converge such that, in the limit, only the base layer symbols are detectable. That is, when only the base layer symbols are detectable, the detectability of the overlay layer symbols becomes close to zero.

Modifying the constellation points allows a broadcaster flexibility, in effect, to adjust the availability of the overlay services and their coverage area. For instance, if the constellation points within a quadrant converge to a lower modulation order, a receiver would be unable to distinguish the overlay layer symbols from the base layer symbols. On the other hand, when the distance between the constellation points within a quadrant diverge the robustness of the overlay layer symbols is improved at the expense of the robustness of the base layer symbols. Accordingly, a broadcaster may have a transmitter capable of sending the base and overlay layer symbols before receivers capable of detecting the overlay symbols are deployed and may configure the transmitter such that only the base layer symbols are transmitted. In this way, interference between the base and overlay layer symbols need not be incurred until the receivers capable of detecting the overlay layer symbols are deployed. Once such receivers are deployed, a broadcaster may then modify the constellation points of the layered modulated signal to make the overlay layer symbols detectable.

Referring to FIG. 1, there is depicted a flow diagram 100 of an example method for modifying or varying the modulation intensity for the layered service modes associated with HD Radio technology. As previously discussed, this can be achieved by adjusting the relative positions of the constellation points that form the layered or hierarchical signal. In accordance with block 102, overlay layer symbols and base layer symbols are generated. The symbols are generated from respective base and overlay bit streams. Each bit stream may comprise one or more logical channels as is shown in FIG. 3.

Figure 3A:
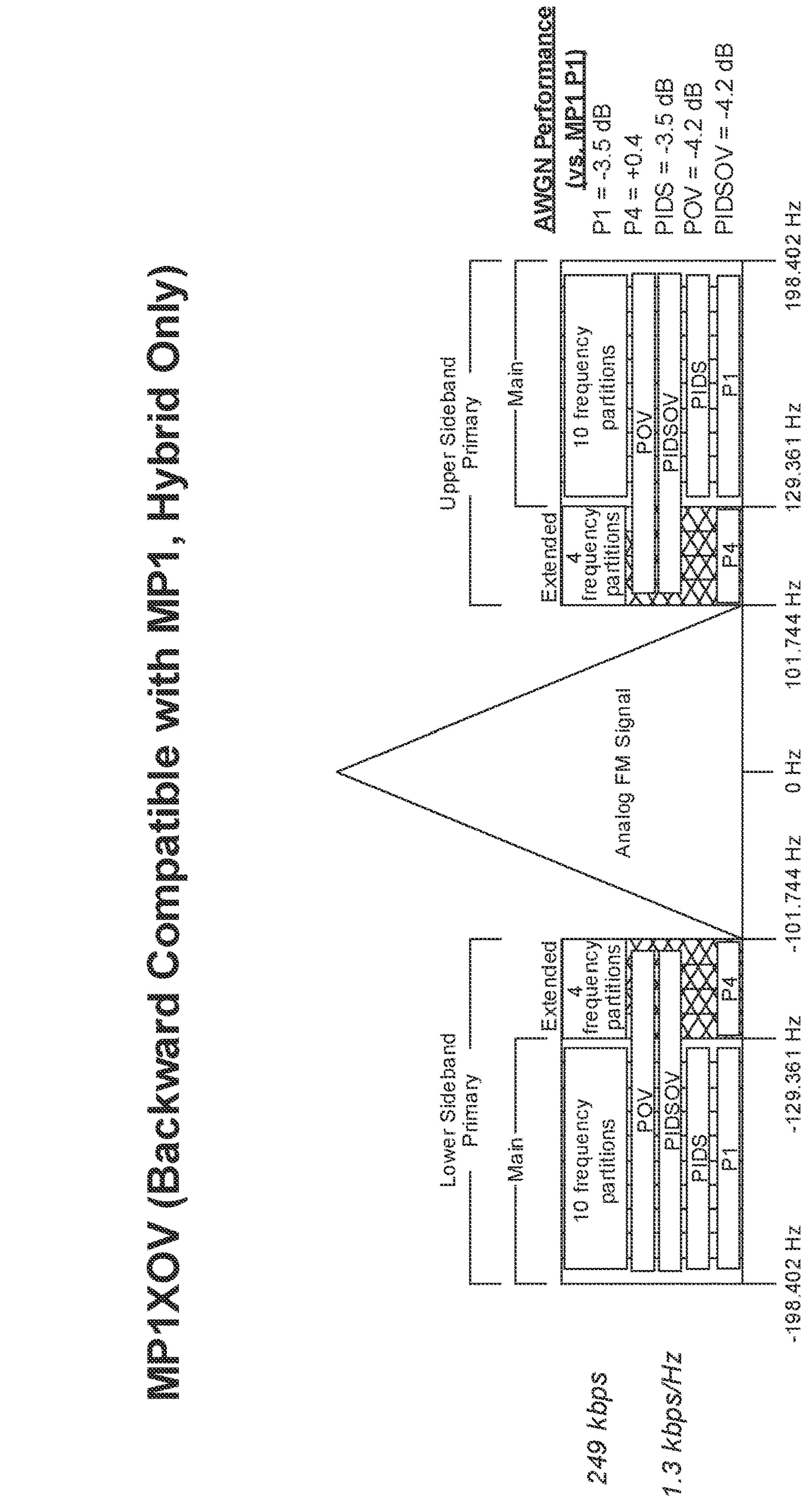
FIGS. 3A-D depict representations of mappings of logical channels to frequency spectra of layered FM HD Radio service modes according to aspects of the disclosure.

Specifically, FIGS. 3A-D depict schematic representations of the spectra of layered HD Radio service modes. In particular, FIG. 3A illustrates a 16-QAM waveform with a QPSK-modulated DSB1 service mode overlaying the base layer MP1X service mode. The MP1X service mode is backward compatible with the MP1 service mode, and thus, a receiver that can receive the MP1X service mode may also receive the MP1 service mode. The MP1X service mode may include multiple OFDM subcarriers in the upper primary main (PM) and primary extended (PX) sidebands, and the lower PM and PX sidebands. The multiple subcarriers in the upper and lower PM sideband each may form ten frequency partitions. MP1X service mode may include an increased capacity over MP1 service mode by having 76 additional subcarriers added to each of the upper and lower PX sidebands of the MP1X service mode. The 76 subcarriers may be arranged into four additional frequency partitions in each of the upper and lower PX sidebands. There may be a total of eight additional frequency partitions. The added PX sideband may be arranged closer to the analog host signal than the PM sidebands.

There may be at least nine logical channels available in the FM HD Radio system; P1, P2, P3, P4, POV, PIDS, PIDSOV, SIDS, and S1. As shown in FIG. 3A, the MP1X service mode may have the P1 and PIDS logical channels mapped to the PM sideband, and the P4 logical channel mapped to the PX sidebands. Only logical channels P1 and PIDS may be active in the legacy MP1 service mode. New receivers may receive not only the original P1 and PIDS logical channels but also the P4 logical channels. However, legacy receivers may still receive the P1 and PIDS logical channels in the MP1X service mode as if the MP1 service mode is being transmitted.

The DSB1 overlay is not backward compatible with other service modes and legacy receivers may not receive the DSB1 overlay service mode. The DSB1 service mode may include multiple OFDM subcarriers in the upper and lower primary sidebands forming fourteen frequency partitions on each sideband. As shown in FIG. 3A, the POV and PIDSOV logical channels are mapped to the upper and lower primary sidebands in the MP1X service mode.

By overlaying the DSB1 service mode on top of the MP1X service mode, the transmitter may transmit a hierarchically modulated signal using the POV, PIDSOV, PIDS, P1, and P4 channels. Legacy receivers may only receive the PIDS and the P1 channels, but newer receivers may receive P1, PIDS. P4, PIDSOV, and POV channels.

Figure 3B:
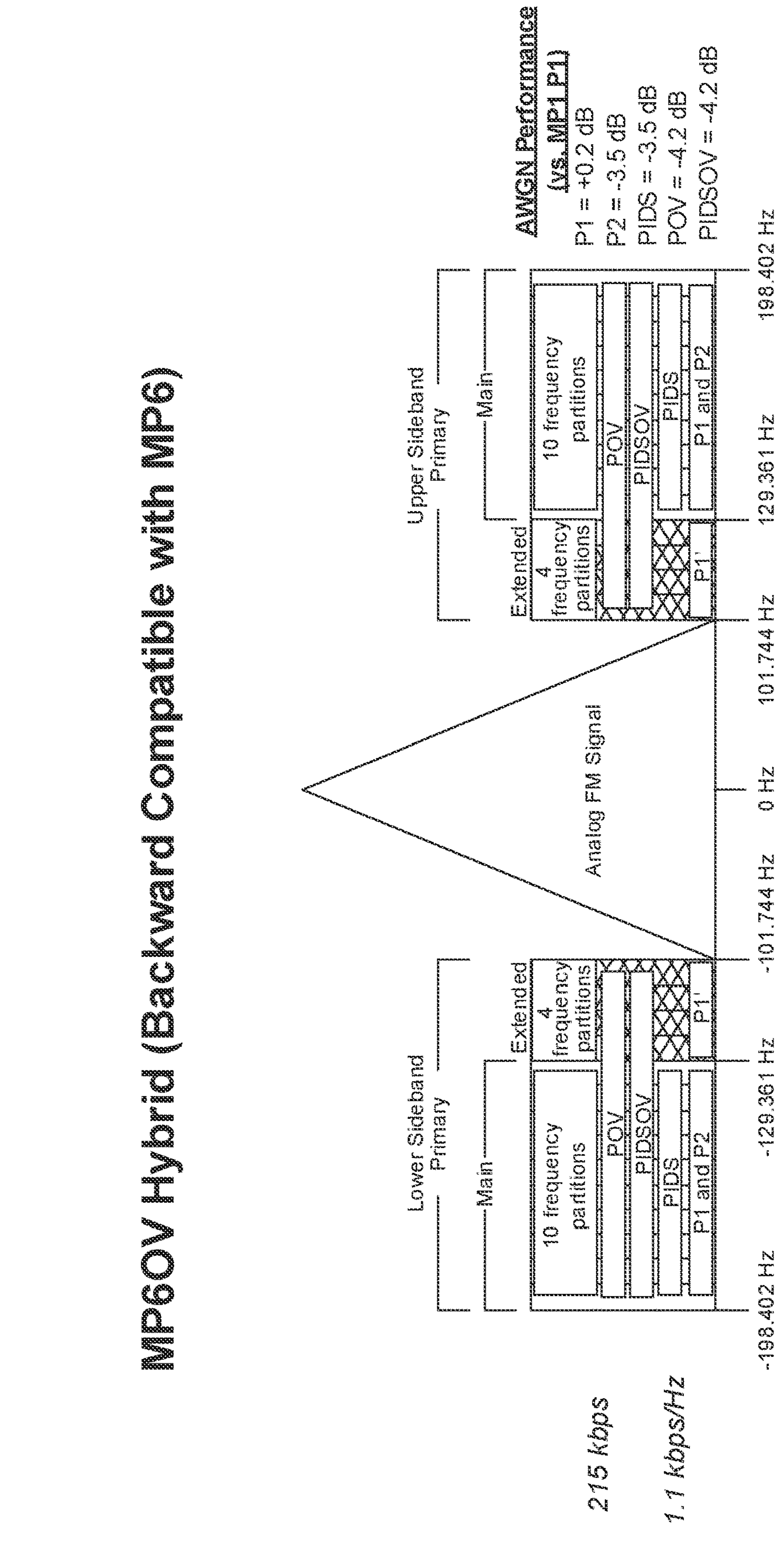

Referring to FIG. 3B, a 16-QAM MP6OV waveform may be comprised of the DSB1 service mode in QPSK format overlaying the base layer MP6 service mode. The hierarchically modulated signal shown in FIG. 3B may be backward compatible with the MP6 service mode. However, the legacy receivers may not receive the POV and PIDSOV channels transmitted in the DSB1 overlay. Thus, only newer receivers may receive all of the POV, PIDSOV, PIDS, P1, P2, and P1' channels while legacy receivers may receive PIDS, P1, P2, and P1' channels.

Figure 3C:
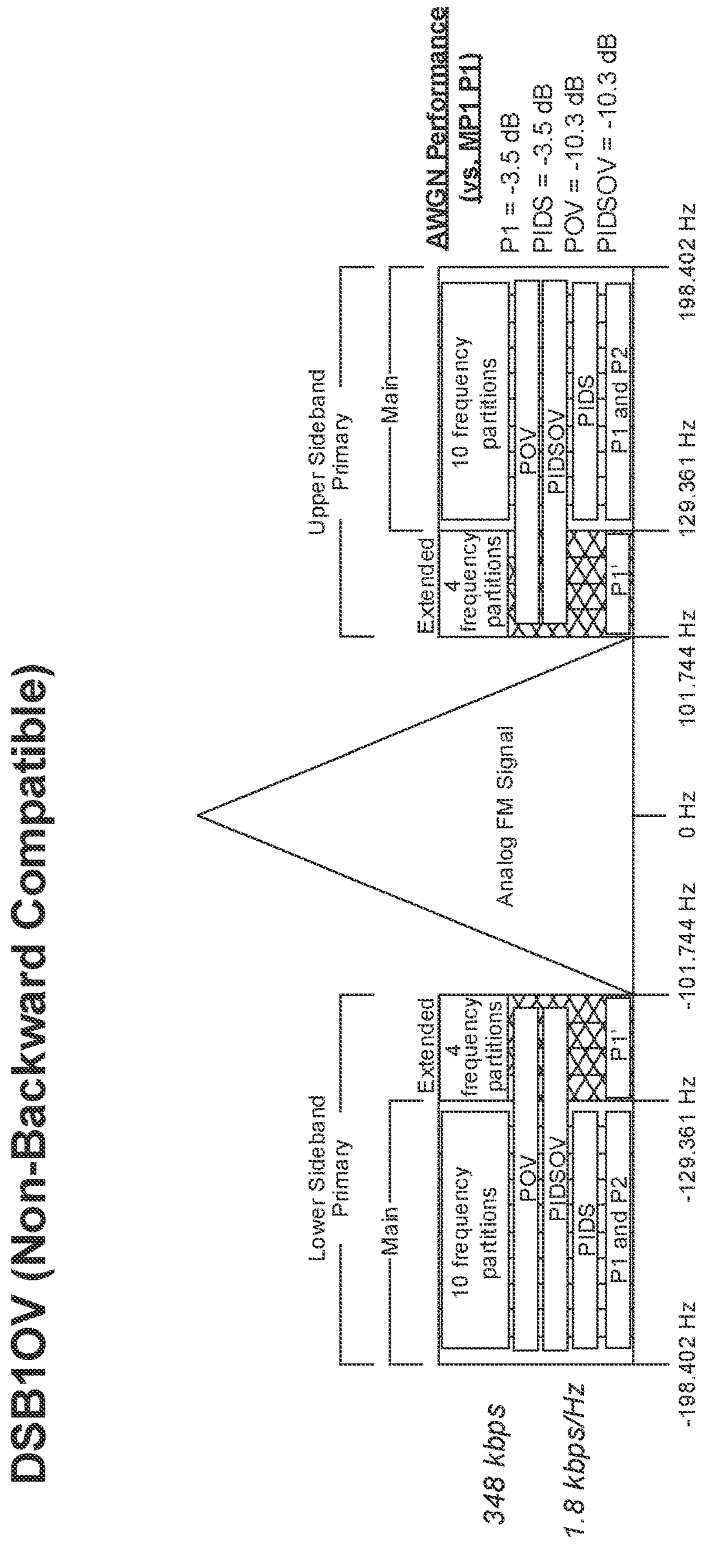

Referring to FIG. 3C, a spectrum modulated as a 64-QAM waveform is illustrated. The 64-QAM waveform may include the DSB1 service mode in QPSK format overlaying the DSB1 service mode in 16-QAM format. The DSB1 service mode is not backward compatible with any other service modes and no legacy receivers may receive the DSB1 service mode. As shown in FIG. 3C, the hierarchically modulated signals may be sent via POV, PIDSOV, PIDS, and P1 channels.

Figure 3D:
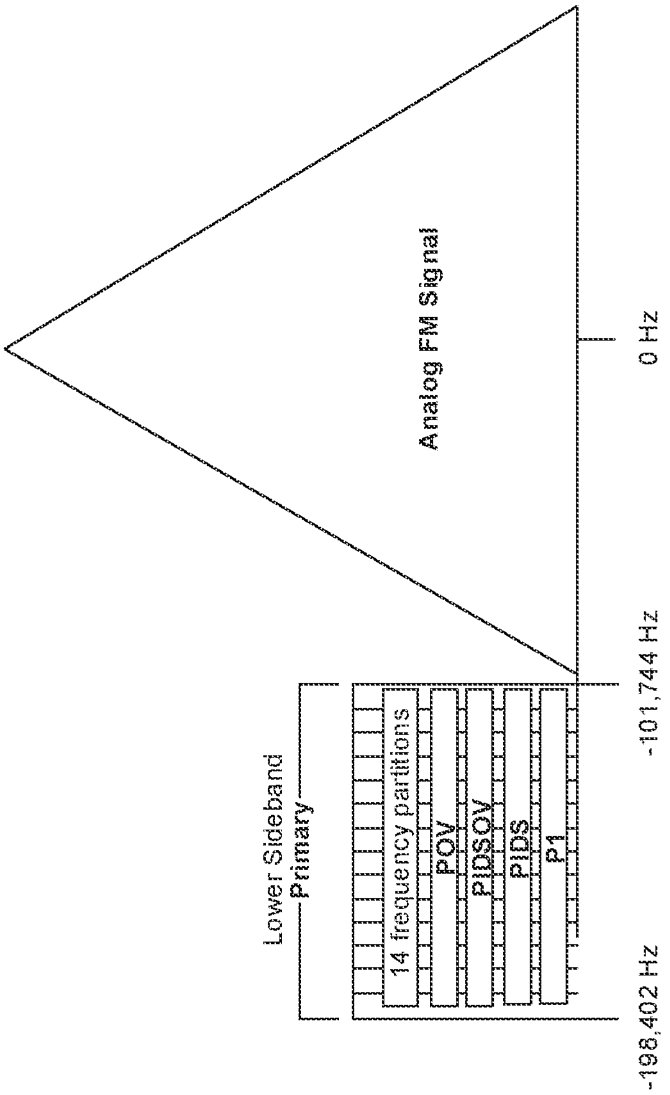

Referring to FIG. 3D, a spectrum modulated as a 64-QAM waveform is illustrated for the SSB1OV service mode. The 64-QAM SSB1OV waveform may be comprised of the QPSK-modulated SSB1 service mode overlaying the 16-QAM-modulated SSB1 service mode base layer. The hierarchically modulated signal shown in FIG. 3D may not be backward compatible with any existing service modes. Only the new receivers may receive all of the POV, PIDSOV, PIDS and P1 channels.

Referring again to FIG. 1, as illustrated in block 104, the constellation points may be modified so that the robustness of the overlay layer symbols may be adjusted relative to the robustness of the base layer symbols. Since legacy receivers may only receive the backward-compatible base layer symbols of some service modes, the transmitter may need to modify the constellation points such that the constellation points reflect only the base layer symbols. Once sufficient numbers of receivers implementing advanced service modes have been fielded, the broadcaster may no longer desire to modify the constellation points or may only need to adjust the constellation points to reduce interlayer interference or adjust the coverage area of the overlay layer.

Once the constellation points are modified, according to block 106, the resulting signal may be OFDM modulated and transmitted. The resulting effect is modifying or adjusting the robustness of the overlay layer symbols relative to that of the base layer symbols.

Figure 2:
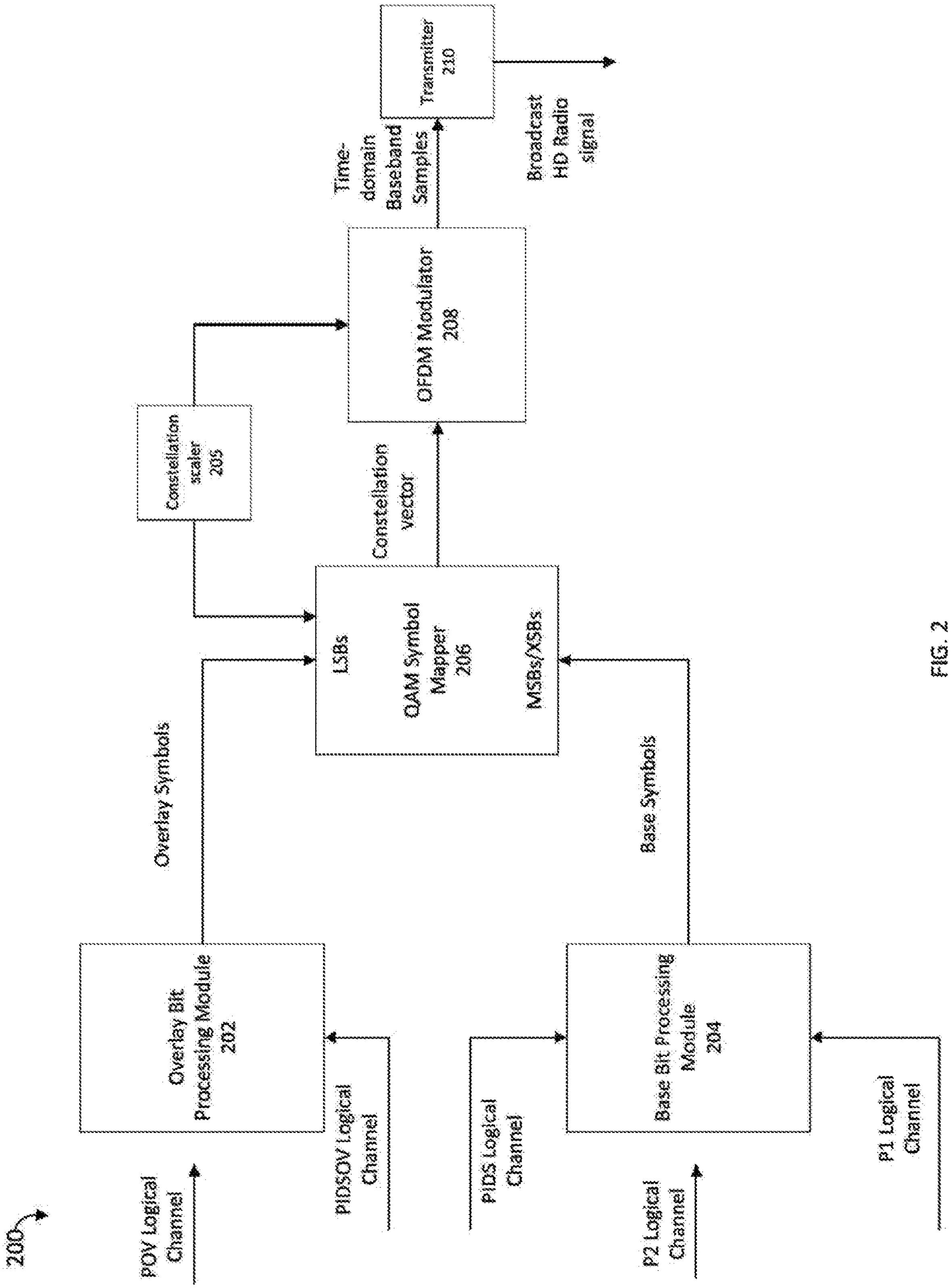
FIG. 2 depicts a block diagram illustrating an example of an apparatus or circuitry for modifying the modulation intensity for layered FM HD Radio service modes according to aspects of the disclosure.

Referring to FIG. 2, there is depicted a block diagram illustrating functional elements, which may be implemented in circuitry, for generating a modifiable layered modulated signal for transmission or broadcasting as an FM HD Radio signal. Overlay bit processing module 202 may receive the input bit information for the overlay layer symbols from the POV and PIDSOV logical channels. Base bit processing module 204 may receive the input bit information for the base layer symbols from PIDS, P2, and P1 logical channels. According to some examples, QAM symbol mapper 206 may receive overlay layer symbols and base layer symbols from overlay bit processing module 202 and base bit processing module 204.

QAM symbol mapper 206 may receive the input symbols and generate constellation points. Specifically, QAM symbol mapper 206 may combine the overlay and base layer symbols to create constellation points in 16-QAM or 64-QAM formats. QAM symbol mapper 206 may send the constellation points to OFDM modulator 208.

QAM symbol mapper 206 or OFDM modulator 208 may interact with constellation scaler 205 to adjust the robustness of the overlay layer symbols relative to the base layer symbols by adjusting the relative distance between the constellation points. In some examples, constellation scaler 205 may be embedded in QAM symbol mapper 206 or OFDM modulator 208. In other examples, constellation scaler 205 may comprise a stand-alone module coupled to either QAM symbol mapper 206 or OFDM modulator 208 (as shown). As such, the scaling may occur in either QAM symbol mapper 206 or OFDM modulator 208. The constellation scaler 205 may also be designed such that the scaling functionality is carried out by both the QAM symbol mapper 206 and OFDM modulator 208.

As the distance between the constellation points resulting from combining of the overlay layer symbols and base layer symbols changes, the relative robustness of the base layer and overlay layer symbols changes.

Figure 4:
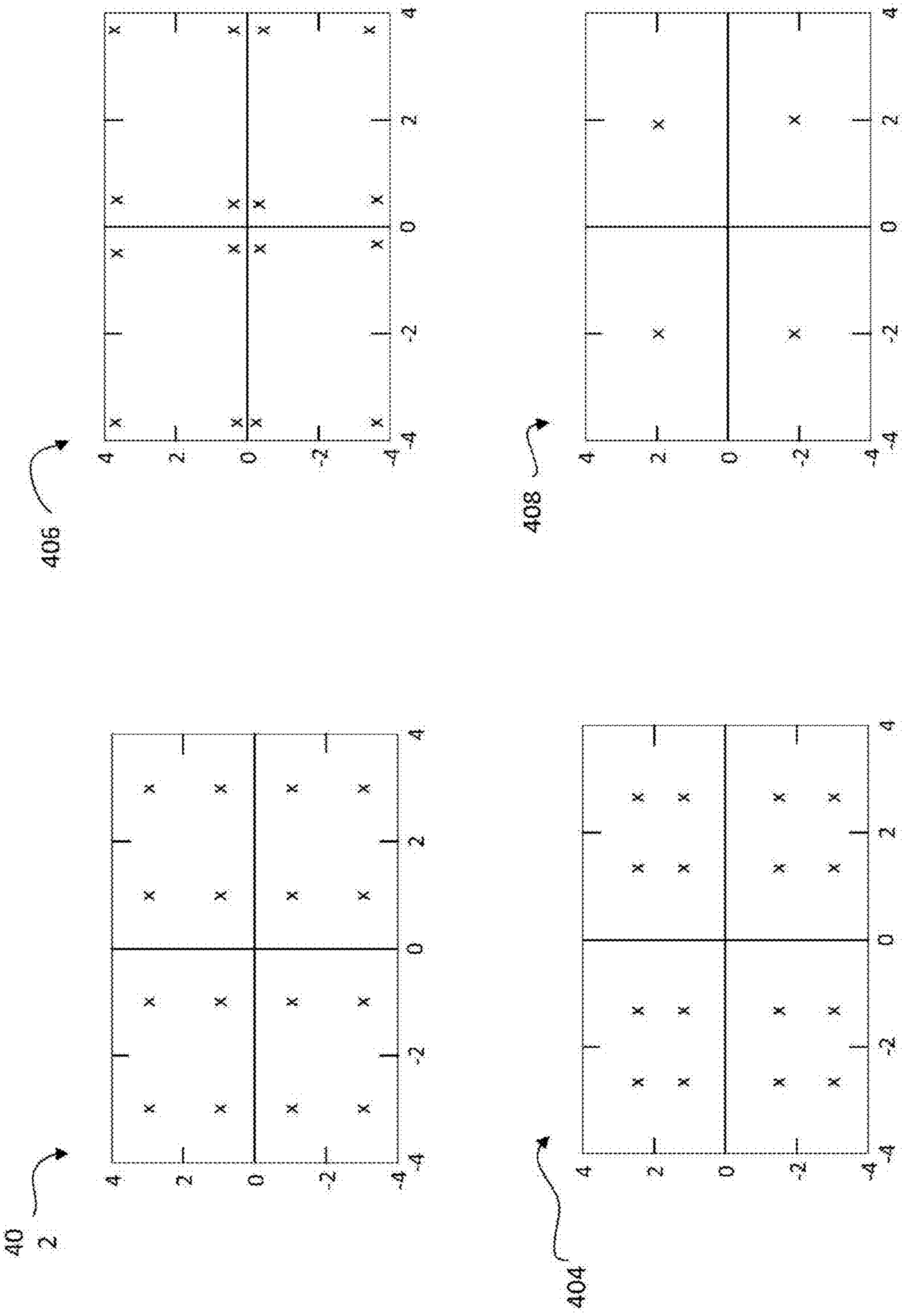
FIG. 4 illustrates differently scaled constellation points of FM HD Radio layered service modes resulting in different robustness of the overlay layer symbols/bits relative to the base layer symbols/bits according to aspects of the disclosure.

Turning now to FIG. 4, there are illustrated examples of adjustments to constellation points of a hierarchically modulated composite signal comprising overlay layer and base layer symbols. As shown in FIG. 4, the distance between the constellation points within a quadrant is adjusted between positions where they are located closer to the corners of each rectangle defining a quadrant to a position where they are located at the center of each rectangle. The adjustments to the positions reflect an adjustment to the robustness of the overlay layer symbols relative to the base layer symbols.

More specifically, FIG. 4 illustrates constellation points of a hierarchically modulated signal comprising overlay layer symbols in QPSK format combined with base layer symbols in QPSK format. QPSK may be considered a quadrature amplitude modulation using four points and uses two code bits per subcarrier per symbol. When a QPSK signal is layered on another QPSK signal, the hierarchically modulated signal may be represented in a 16-QAM format with 16 points in the constellation. Diagram 402 represents 16 points equally distant from one another without any scaling or intensity change to the constellation points. As the scaling factor associated with the constellation points is changed, the distances between each constellation point within a quadrant may decrease as shown in diagram 404. This reflects an improvement in the performance of the base layer symbols and a degradation in the performance of overlay layer symbols. Diagram 406 illustrates that the distances between each constellation point within a quadrant may increase to a maximum level, such that the constellation points are located proximate to the corners of each quadrant. In this example, although the constellation points within a quadrant are more separated, the performance level of the overlay layer signal could be degraded since the constellation points near the quadrant borders may interfere with other constellation points in the other quadrants. In this scenario, both the performance of the overlay and base layers may be degraded. As shown in diagram 408, the distance between the constellation points may be adjusted so they appear as only one constellation point in each quadrant. In this scenario, the overlay symbols become undetectable or unrecoverable (e.g., too high an error rate to recover the signal) and only the base symbols are detectable.

Returning to FIG. 2, OFDM Modulator 208 may modulate the constellation points of the symbols of both the overlay layer and the base layer to form a composite baseband signal. The constellation points of this signal may be scaled via constellation scaler 205 so that the constellation points appear as shown in FIG. 4 or at locations between those shown. The hierarchically modulated signal may be sent to transmitter 210 as time-domain baseband samples for transmission. Transmitter 210 contains the circuitry and other elements, e.g., filters, mixers, and amplifiers, for broadcasting the signals it receives.

Figure 5A:
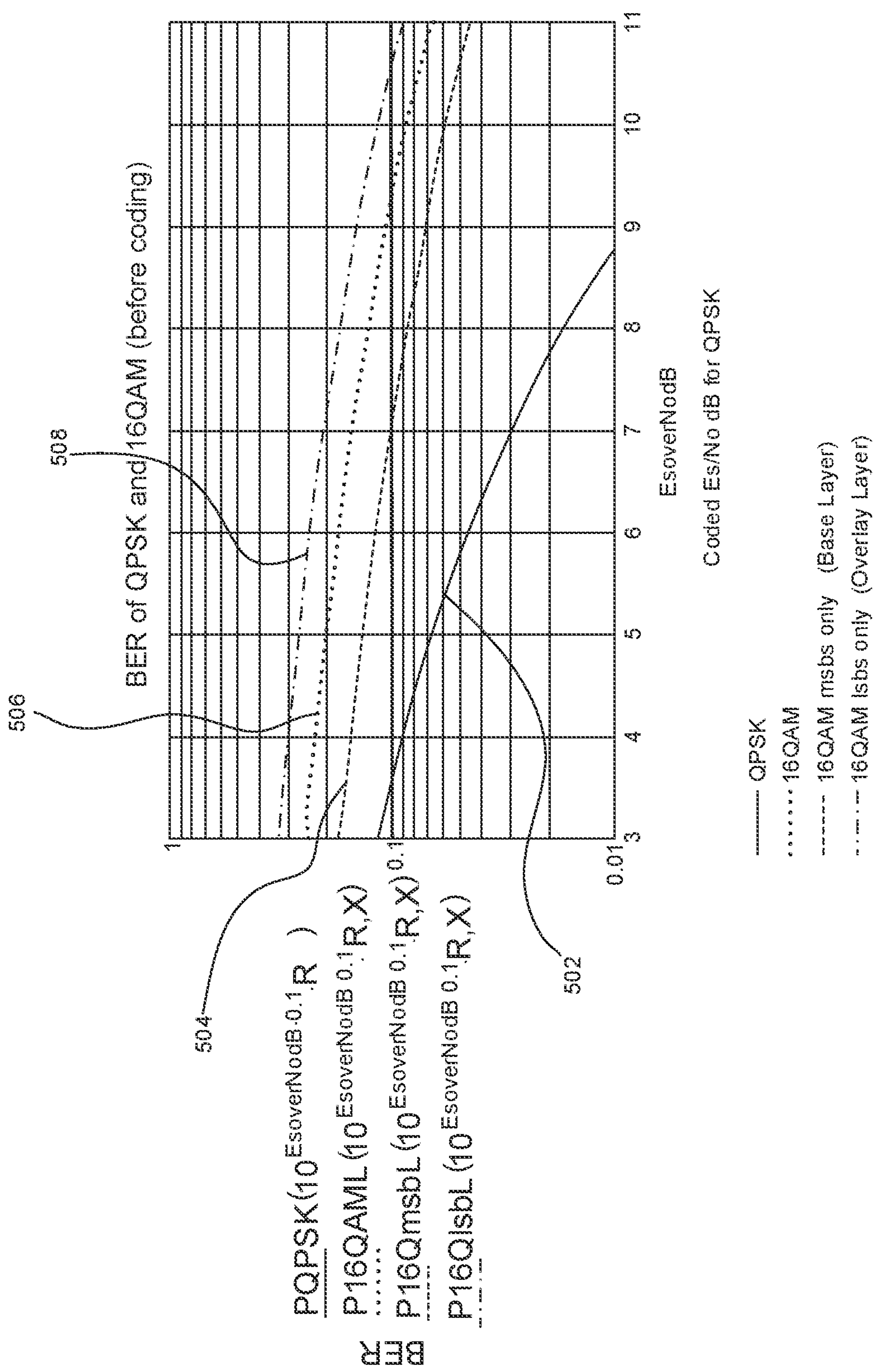
FIGS. 5A-C depict graphs of the Bit Error Rate (BER) of QPSK symbols, 16 QAM symbols, and their constituent base and overlay components according to aspects of the disclosure.
Figure 5B:
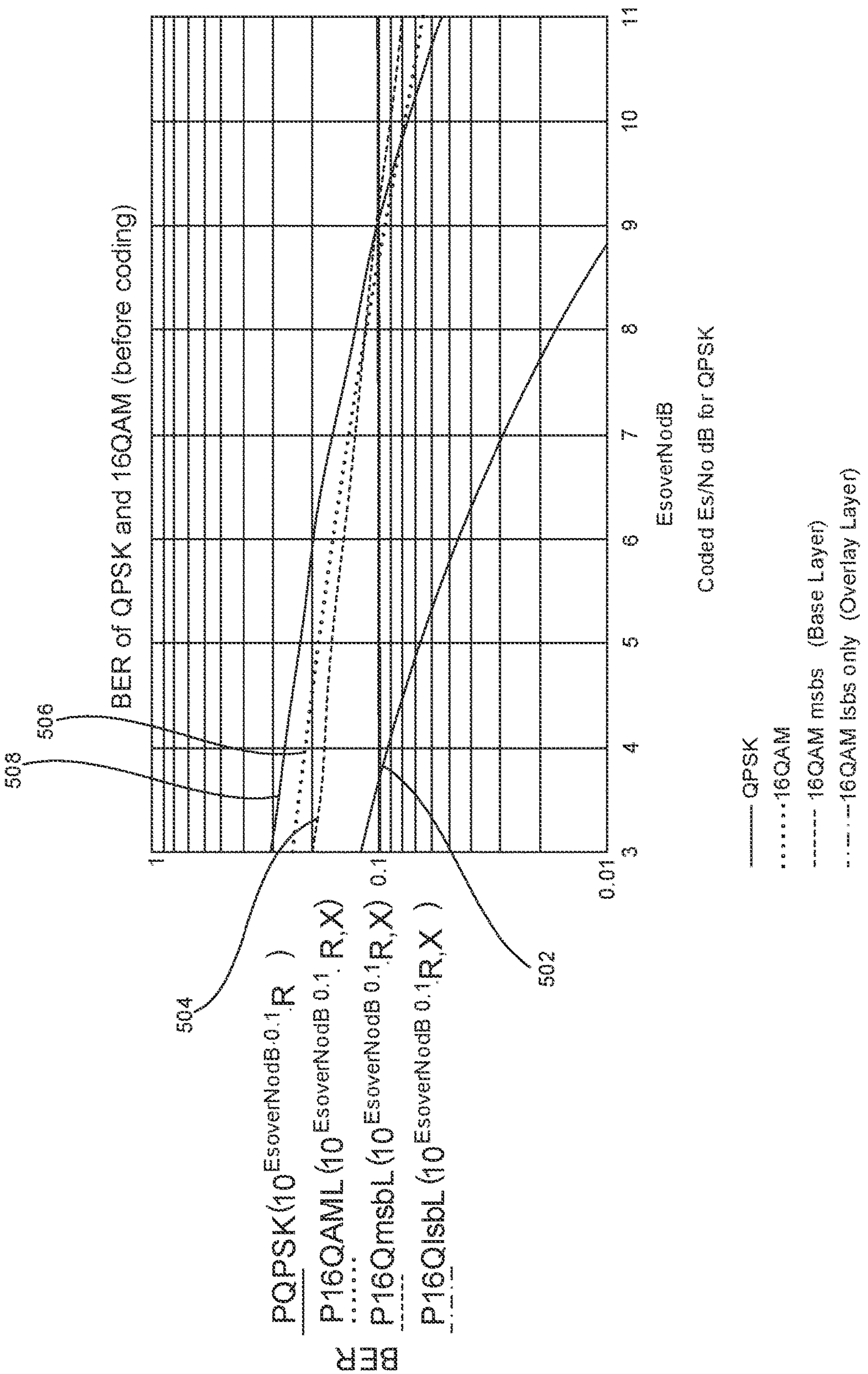
Figure 5C:
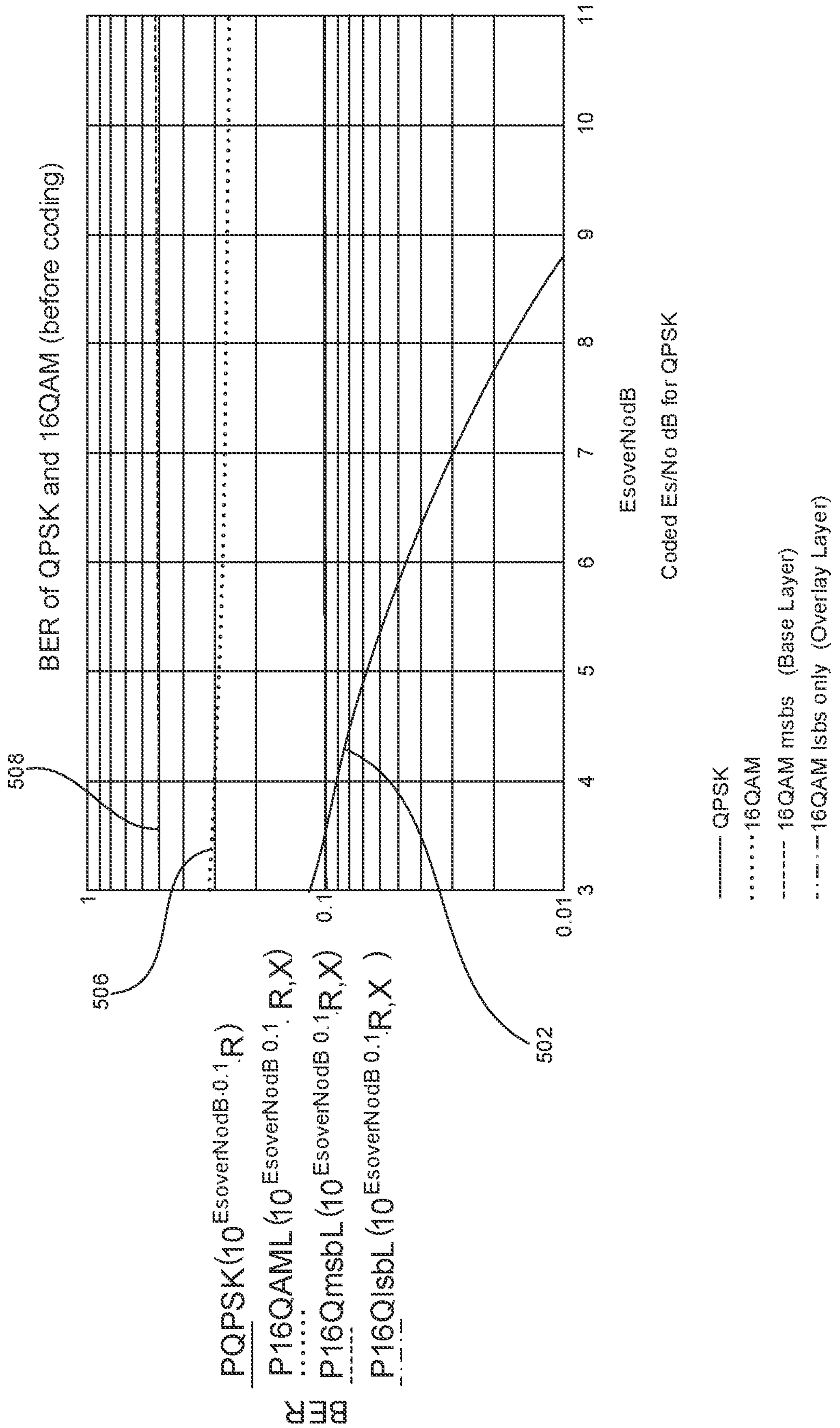

FIGS. 5A-C include graphs that illustrate simulated examples of the Bit Error Rate (BER) performance possible with a system implemented in accordance with aspects of the disclosed technology. BER provides a measure of the ratio of the total number of bits received in error relative to the total number of bits received. Received bits may be altered during transmission due to various transmission effects such as noise, interference, and distortion. Each graph shows the probability of bit errors for the different signals shown. FIG. 5A represents the bit error rates of a QPSK signal and a 16-QAM signal as well as the base and overlay layer of a layered modulated signal. The y-axis represents bit error rates, and the x-axis represents energy per symbol to noise power spectral density ratio (Es/No). Es/No may be a normalized signal-to-noise ratio (SNR) per bit.

PQPSK 502 represents a bit error rate plot of a QPSK signal, without transmission of a companion overlay signal. P16QmsbL 504 may represent a bit error rate of the most significant bits of the 16-QAM signal. P16QlsbL 508 may represent a bit error rate of the least significant bits of the 16-QAM signal. With respect to FIG. 2, the least significant bits represent the overlay symbols in FIG. 2, while the most significant bits represent the base symbols. P16QAML 506 may represent a bit error rate of the composite16-QAM signal.

According to some examples, the bit error rates of each PQPSK, P16QAM, P16Qmsb, and P16Qlsb may be derived using the equations below.

$$P16QmsbL(EsoverNo, X) := \frac{1}{4} \cdot \left[\operatorname{erfc}(2 - X) \cdot \sqrt{scaleL4(X) \cdot EsoverNo}\right] + \operatorname{erfc}\left[(2 + X) \cdot \sqrt{scaleL4(X) \cdot EsoverNo}\right]\Big]$$

$$P16QlsbL(EsoverNo, X) := \frac{1}{4} \cdot \begin{bmatrix} \operatorname{erfc}\left(X \cdot \sqrt{scaleU4EsoverNo}\right) + \operatorname{erfc}\left[(4 - X) \cdot \sqrt{scaleU4EsoverNo}\right] \ldots + \\ \operatorname{erfc}\left(X \cdot \sqrt{scaleU4EsoverNo}\right) - \operatorname{erfc}\left[(4 + X) \cdot \sqrt{scaleU4EsoverNo}\right] \end{bmatrix}$$

$$P16QlsbL(EsoverNo, X) := \frac{1}{4} \cdot \left[2 \cdot \operatorname{erfc}\left(X \cdot \sqrt{scaleU4EsoverNo}\right) + \operatorname{erfc}\left[(4 - X) \cdot \sqrt{scaleU4EsoverNo}\right] - \operatorname{erfc}\left[(4 + X) \cdot \sqrt{scaleU4EsoverNo}\right]\right]$$

$$P16QAML(EsoverNo, X) := \frac{P16QmsbL(EsoverNo, X) + P16QlsbL(EsoverNo, X)}{2}$$

Where, $RU1 = 1$, $RU3 = 3$, $scaleU2 = RU1 = 1$, $scaleU4 = 2/(RU1\hat{}2 + RU3\hat{}2) = 0.2$, $X = 0.1 \ldots 1.5$, $scaleL4(X) = 1/(X\hat{}2 + 4)$.

FIG. 5A represents BER performance when the constellation points are equidistant per standard 16-QAM (e.g., scale 'X=1').

FIG. 5B represents BER performance when the constellation points are scaled with X=1.2. P16QAML, P16QmsbL, and P16QlsbL are equal at a BER of 0.1 which is near the digital audio reception threshold. FIG. 5B represents the condition when the constellation points are spaced similarly to those illustrated as in element 406 of FIG. 4.

FIG. 5C represents BER performance when the constellation points are scaled with X=0. FIG. 5C represents the condition when the constellation points are spaced similarly to those illustrated as in element 408 of FIG. 4. The overlay bits would be undetectable in this case.

Figure 6A:
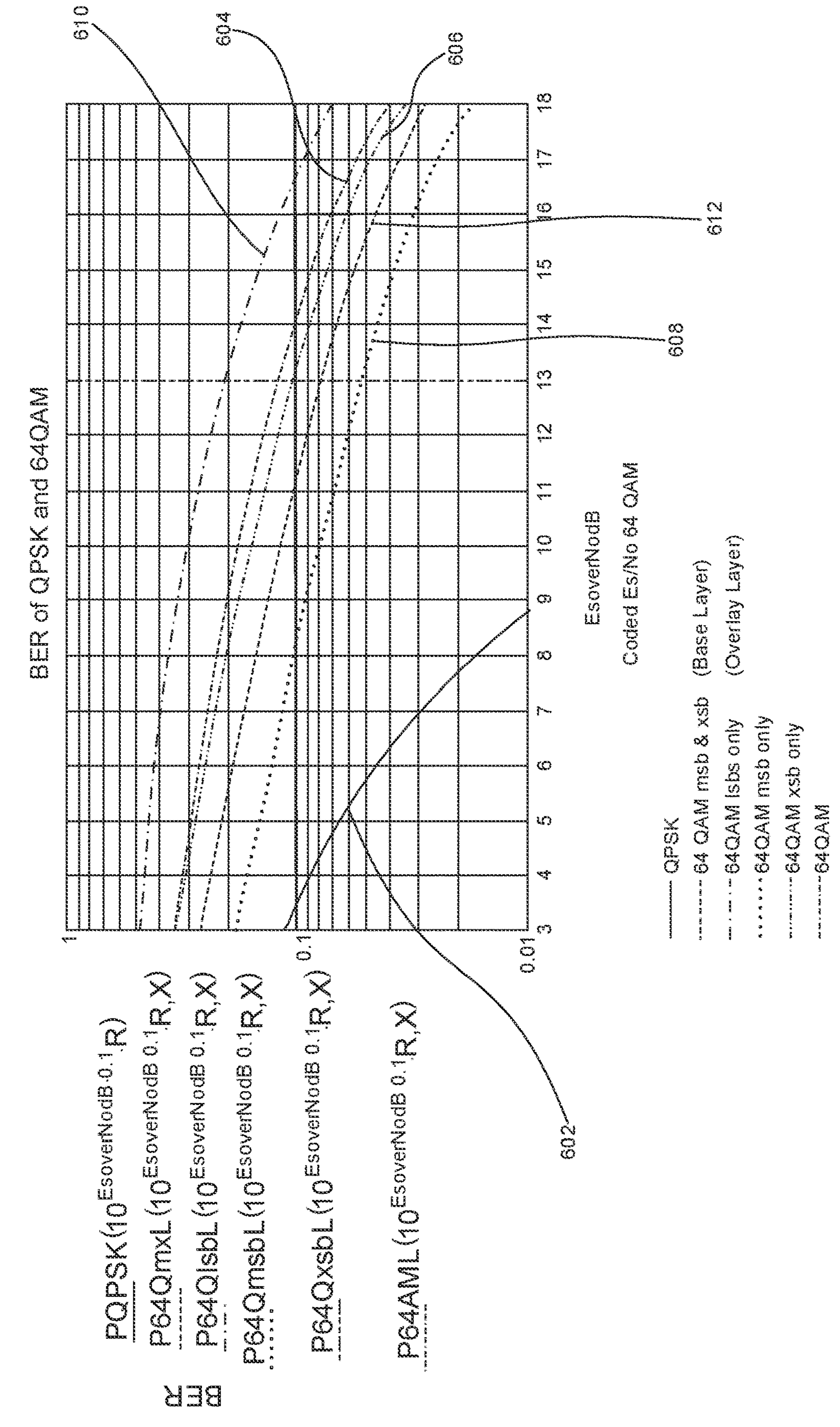
FIGS. 6A-C depict graphs of the Bit Error Rate (BER) of QPSK symbols, 64 QAM symbols, and their constituent components according to aspects of the disclosure.
Figure 6B:
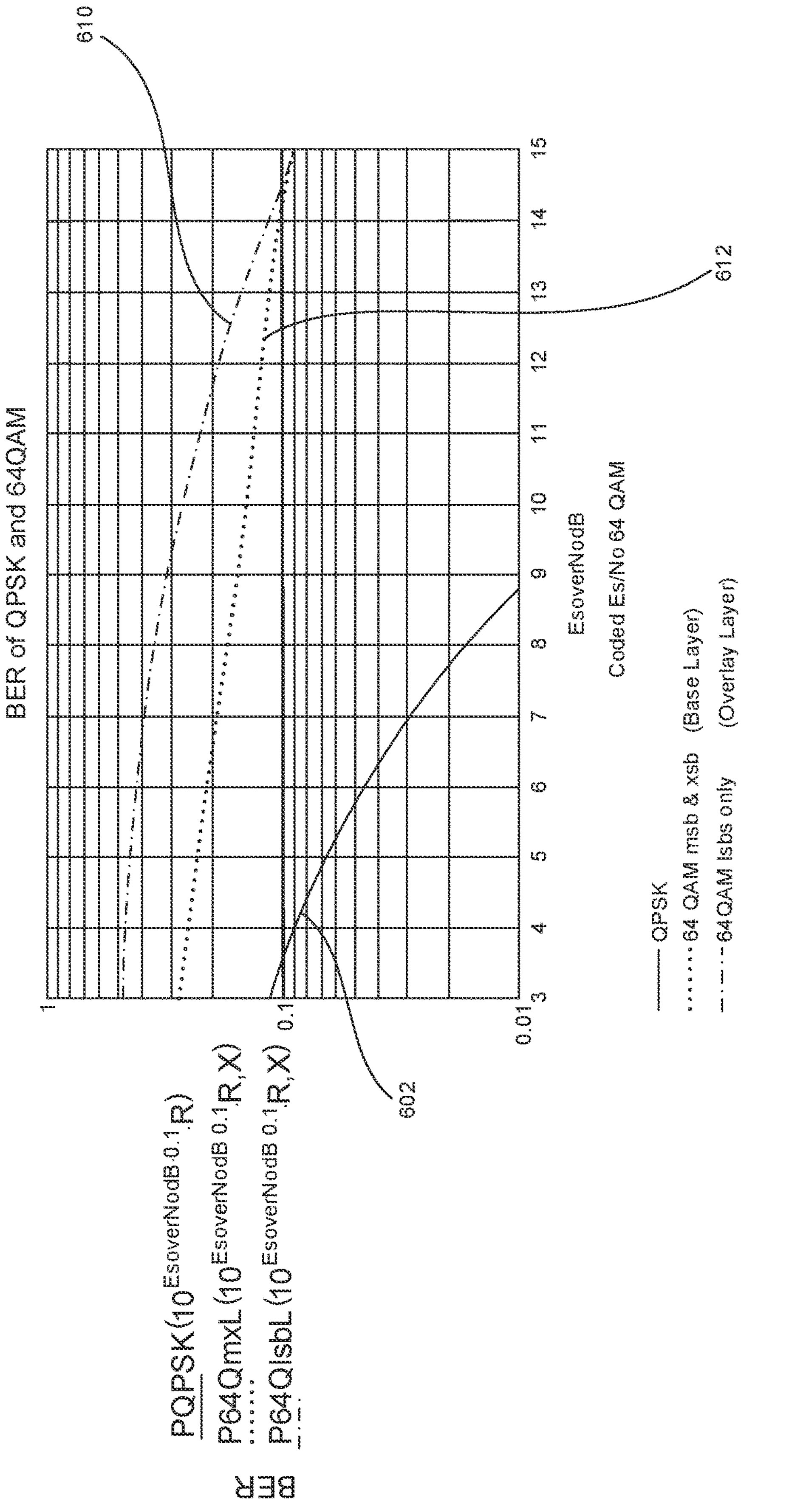
Figure 6C:
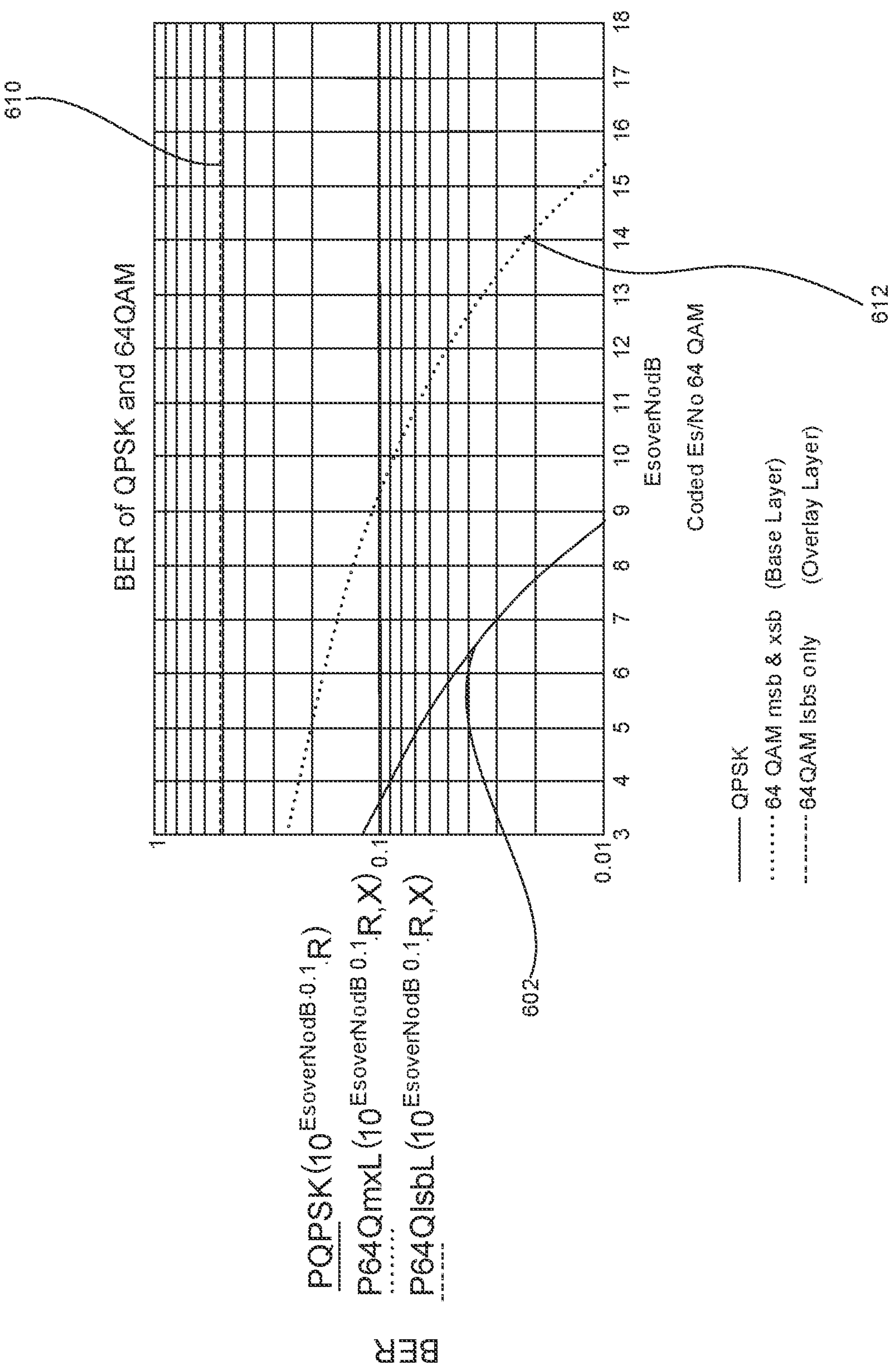

FIGS. 6A-C depict graphs of the Bit Error Rate (BER) of a QPSK overlay and a 16-QAM base forming a 64-QAM signal. The graphs represent PQPSK 602, P64QAML 604, P64QmsbL 608, P64QxsbL 606, and P64QlsbL 610. P64QlsbL 610 may represent the overlay bits. P64QmxL 612 may represent the base bits. P64QAML 604 may represent equidistant constellation points per a standard 64-QAM signal. Each graph may be calculated using the following equations.

$$P64QmsbL(EsoverNo, X) := \frac{1}{8} \cdot \begin{bmatrix} \operatorname{erfc}\left[(2 - X) \cdot \sqrt{scaleL8(X) \cdot EsoverNo}\right] + \\ \operatorname{erfc}\left[(2 + X) \cdot \sqrt{scaleL8(X) \cdot EsoverNo}\right] \ldots + \\ \operatorname{erfc}\left[(6 - X) \cdot \sqrt{scaleL8(X) \cdot EsoverNo}\right] + \\ \operatorname{erfc}\left[(6 + X) \cdot \sqrt{scaleL8(X) \cdot EsoverNo}\right] \end{bmatrix}$$

$$P64QxsbL(EsoverNo, X) := \frac{1}{8} \cdot \begin{bmatrix} 2\operatorname{erfc}\left[(2 - X) \cdot \sqrt{scaleL8(X) \cdot EsoverNo}\right] + \\ 2 \cdot \operatorname{erfc}\left[(2 + X) \cdot \sqrt{scaleL8(X) \cdot EsoverNo}\right] \ldots + \\ \operatorname{erfc}\left[(6 - X) \cdot \sqrt{scaleL8(X) \cdot EsoverNo}\right] + \\ \operatorname{erfc}\left[(6 + X) \cdot \sqrt{scaleL8(X) \cdot EsoverNo}\right] \ldots + \\ \operatorname{erfc}\left[(10 - X) \cdot \sqrt{scaleL8(X) \cdot EsoverNo}\right] + \\ \operatorname{erfc}\left[(10 + X) \cdot \sqrt{scaleL8(X) \cdot EsoverNo}\right] \end{bmatrix}$$

-continued $$P64QmxL(EsoverNo, X) := \frac{1}{2} \cdot (P64QmsbL(EsoverNo, X) + P64QxsbL(EsoverNo, X))$$

$$P64QlsbL(EsoverNo, X) := \frac{1}{8} \cdot \begin{bmatrix} 4\operatorname{erfc}\left(X \cdot \sqrt{scaleL8(X) \cdot EsoverNo}\right) + \\ 3 \cdot \operatorname{erfc}\left[(4 - X) \cdot \sqrt{scaleL8(X) \cdot EsoverNo}\right] \ldots + \\ 2 \cdot \operatorname{erfc}\left[(8 + X) \cdot \sqrt{scaleL8(X) \cdot EsoverNo}\right] - \\ 3 \cdot \operatorname{erfc}\left[(4 + X) \cdot \sqrt{scaleL8(X) \cdot EsoverNo}\right] \ldots + \\ \operatorname{erfc}\left[(12 - X) \cdot \sqrt{scaleL8(X) \cdot EsoverNo}\right] + \\ -\operatorname{erfc}\left[(12 + X) \cdot \sqrt{scaleL8(X) \cdot EsoverNo}\right] \ldots + \\ -2 \cdot \operatorname{erfc}\left[(8 - X) \cdot \sqrt{scaleL8(X) \cdot EsoverNo}\right] \end{bmatrix}$$

$$P64QAML(EsoverNo, X) := \frac{1}{3} \cdot (P64QmsbL(EsoverNo, X) + P64QxsbL(EsoverNo, X) + P64QlsbL(EsoverNo, X))$$

where $X = 0, 0.1 \ldots 1.5$, $scaleL4(X) = 1/(X\hat{}2 + 4)$, $scaleL8(X) = 1/(X\hat{}2 + 20)$ FIG. 6A represents BER performance when the constellation points are equidistant per a standard 64-QAM signal with X=1.

FIG. 6B represents equal base and overlay BER performances when X=1.35 at a BER of 0.1 which is near the digital audio reception threshold. In this case, the overlay performance is improved at the expense of a degraded base performance.

FIG. 6C represents BER performances when the constellation points are scaled with X=0. The overlay bits would be undetectable in this case. The base constellation may be identical to element 402 of FIG. 4 and the base performance may be identical to curve 506 of FIG. 5A per a standard 16-QAM signal and equidistant constellation points.

Alternate Embodiments and Exemplary Operating Environment

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical or functional blocks and modules described in connection with the embodiments disclosed herein (e.g., see FIG. 2) can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. For example, the bit processing modules 202, 204, QAM symbol mapper 206, constellation scaler 205 and OFDM modulator 208 may comprise one or more processing circuit elements (e.g., ASIC, FGPA) that coupled together to carry out their respective functions (e.g., as processing circuitry). A general-purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer-readable media may comprise computer storage media and communication media.

Computer storage media includes, but is not limited to, computer or machine-readable media or storage devices such as Blu-ray discs (BD), digital versatile discs (DVDs), compact discs (CDs), floppy disks, tape drives, hard drives, optical drives, solid-state memory devices, RAM memory. ROM memory, EPROM memory. EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the system and method described herein, or portions thereof, may be stored, received, transmitted, or read from any desired combination of computer or machine-readable media or storage devices and communication media in the form of computer executable instructions or other data structures.

Embodiments of the system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

The invention claimed is:

1. A radio transmitter comprising:

a processing circuitry that:

- generates a plurality of first symbols from a sequence of base bits;
- generates a plurality of second symbols from a sequence of overlay bits;
- generates a plurality of constellation points associated with the plurality of first symbols and the plurality of second symbols;
- modifies one or more of the plurality of constellation points to produce a set of modified constellation points by adjusting a distance between constellation points within a quadrant to diverge from a center point of the quadrant to adjust a relative performance of the plurality of second symbols and the plurality of first symbols;
- modulates one or more modified constellation points from the set of modified constellation points;
- generates a composite transmission signal based on the one or more modulated constellation points, the composite transmission signal comprising a hierarchically modulated signal; and a transmitter coupled to the processing circuitry to wirelessly broadcast the composite transmission signal.

2. The radio transmitter of claim 1, wherein the processing circuitry includes a scaler that modifies the one or more of the plurality of constellation points to produce the set of modified constellation points.

3. The radio transmitter of claim 2, wherein the processing circuitry includes a symbol mapper configured to generate the plurality of constellation points.

4. The radio transmitter of claim 3, wherein the scaler comprises a circuit element in the symbol mapper.

5. The radio transmitter of claim 2, wherein the processing circuitry includes an orthogonal frequency division multiplexing (OFDM) modulator.

6. The radio transmitter of claim 5, wherein the scaler comprises a circuit element in the OFDM modulator.

7. The radio transmitter of claim 5, wherein the OFDM modulator generates one or more OFDM symbols associated with the set of modified constellation points.

8. The radio transmitter of claim 1, wherein the processing circuitry includes a symbol mapper to generate the plurality of constellation points, a OFDM modulator and a scaler coupled to the symbol mapper and OFDM modulator, the scaler being configured to modify the one or more of the plurality of constellation points to produce the set of modified constellation points.

9. The radio transmitter of claim 1, wherein the plurality of second symbols comprises symbols associated with a DSB1 service mode or an SSB1 service mode.

10. The radio transmitter of claim 9, wherein the plurality of first symbols comprises symbols associated with an MP1X service mode, an MP3X service mode, an MP5 service mode, an MP6 service mode, a DSB1 service mode, or an SSB1 service mode.

11. The radio transmitter of claim 10, wherein each service mode employs at least one of three modulation formats: quadrature phase-shift keying (QPSK), 16-ary quadrature amplitude modulation (16 QAM), and 64-ary quadrature amplitude modulation (64 QAM).

12. The radio transmitter of claim 1, wherein the processing circuitry is configured to modify the one or more of the plurality of constellation points by adjusting a distance between constellation points such that constellation points within a quadrant converge to adjust the relative performance of the plurality of second symbols and the plurality of first symbol.

13. A method for transmitting a radio signal, the method comprising:

- generating a plurality of first symbols from a sequence of base bits;
- generating a plurality of second symbols from a sequence of overlay bits;
- generating a plurality of constellation points associated with the plurality of first symbols and the plurality of second symbols;
- modifying one or more of the plurality of constellation points to produce a set of modified constellation points by adjusting a distance between constellation points within a quadrant to converge towards a center point of the quadrant or to diverge from the center point of the quadrant to cause adjustment of a relative performance of the plurality of second symbols and the plurality of first symbols;

modulating one or more constellation points from the set of modified constellation points;

generating a composite transmission signal based on the one or more modulated constellation points, the composite transmission signal comprising a hierarchically modulated signal; and wirelessly broadcasting the composite transmission signal.

14. The method of claim 13, further comprising:

generating one or more orthogonal frequency division multiplexing (OFDM) symbols associated with the set of modified constellation points.

15. The method of claim 13, wherein the plurality of second symbols comprises symbols associated with a DSB1 service mode or an SSB1 service mode.

16. The method of claim 13, wherein the plurality of first symbols comprises symbols associated with an MP1X service mode, an MP3X service mode, an MP5 service mode, an MP6 service mode, a DSB1 service mode, or an SSB1 service mode.

17. The method of claim 16, wherein each service mode employs at least one of three modulation formats: quadrature phase-shift keying (QPSK), 16-ary quadrature amplitude modulation (16 QAM), and 64-ary quadrature amplitude modulation (64 QAM).

18. A radio transmitter comprising:

a processing circuitry that:

generates a plurality of first symbols from a sequence of base bits, generates a plurality of second symbols from a sequence of overlay bits, generates a plurality of constellation points associated with the plurality of first symbols and the plurality of second symbols, modifies one or more of the plurality of constellation points to produce a set of modified constellation points by adjusting a distance between constellation points within a quadrant to converge towards a center point of the quadrant to adjust a relative performance of the plurality of second symbols and the plurality of first symbols, modulates one or more constellation points from the set of modified constellation points, and generates a composite transmission signal based on the one or more modulated constellation points, the composite transmission signal comprising a hierarchically modulated signal; and a transmitter coupled to the processing circuitry to wirelessly broadcast the composite transmission signal.

19. The radio transmitter of claim 18, wherein the processing circuitry modifies one or more of the plurality of constellation points to produce a set of modified constellation points by adjusting a distance between constellation points within a quadrant to diverge from a center point of the quadrant to adjust a relative performance of the plurality of second symbols and the plurality of first symbols.

20. The radio transmitter of claim 19, wherein the processing circuitry includes a scaler that modifies the one or more of the plurality of constellation points to produce the set of modified constellation points.

* * * * *